United States Patent [19]

Bishel

[11] 4,149,063

[45] Apr. 10, 1979

[54] FLUX CORED WIRE FOR WELDING Ni-Cr-Fe ALLOYS

[75] Inventor: Robert A. Bishel, Huntington, W. Va.

[73] Assignee: The International Nickel Company, Inc., New York, N.Y.

[21] Appl. No.: 782,301

[22] Filed: Mar. 28, 1977

[51] Int. Cl.² .......................................... B23K 35/368
[52] U.S. Cl. ...................... 219/146.23; 219/137 WM; 219/146.3; 219/146.31
[58] Field of Search ...................... 219/145.22, 145.23, 219/146.23, 146.31, 146.41, 146.52, 146.3; 148/23, 24

[56] References Cited

U.S. PATENT DOCUMENTS

| | | | |
|---|---|---|---|
| 3,024,137 | 3/1962 | Witherell | 117/205 |
| 3,113,021 | 12/1963 | Witherell | 75/171 |
| 3,125,470 | 3/1964 | Witherell | 148/24 |
| 3,328,557 | 6/1967 | Rogers | 219/146.52 |
| 3,542,998 | 11/1970 | Huff | 219/146 |
| 3,585,352 | 6/1971 | Zvanut | 219/146 X |
| 3,643,061 | 2/1972 | Dutters | 219/146 |
| 3,778,588 | 12/1973 | Bishel | 219/146 |
| 3,805,016 | 4/1974 | Soejima | 219/146 |
| 3,851,143 | 11/1974 | Bishel | 219/146 |
| 3,866,015 | 2/1975 | Matsumoto | 219/146 |

FOREIGN PATENT DOCUMENTS

| | | | |
|---|---|---|---|
| 284475 | 11/1963 | Australia | 219/146 |
| 288142 | 12/1964 | Australia | 219/146 |

Primary Examiner—Richard R. Kucia
Attorney, Agent, or Firm—Francis J. Mulligan, Jr.; Ewan C. MacQueen

[57] ABSTRACT

A self-shielding, flux cored arc welding electrode for joining Ni-Cr-Fe alloys and overlaying dissimilar metals. The wire has a nickel-chromium containing alloy sheath and a flux core containing special proportions of carbonates, fluorides, metal oxides, and powdered metals. Sound welds can be prepared without the use of a supplemental inert shielding gas. Welded joints provide essentially the same properties as those of the Ni-Cr-Fe base alloy.

17 Claims, No Drawings

FLUX CORED WIRE FOR WELDING NI-CR-FE ALLOYS

The present invention is directed to a tubular composite arc welding electrode adapted for use in automatic welding equipment without the requirement for inert shielding gas.

In recent years, a number of self-shielding flux-cored welding materials have been introduced to industry, particularly for the high speed welding of iron base alloys. While the more highly alloyed austenitic metals have been successfully welded with conventionally produced wrought filler metals, it would be highly desirable to prepare weld deposits in such metals with compositions similar to such metals using a flux cored filler metal. The use of a flux cored filler metal can serve to eliminate the requirement for an expensive shielding gas yet still allow high deposition rates through the use of an automatic welding process which accommodates a continuous coil of wire. Since alloying ingredients can be added through the flux core, weld deposits having compositions offering some difficulty during preparation by conventional hot and cold working techniques can be advantageously prepared from relatively low-alloy strip with alloying accomplished through the flux ingredients.

The technology for the production of flux cored welding wires is well known. Essentially, the process consists of forming a metal strip sheath into a U-shaped channel, placing a flux/alloying-ingredient mixture within the channel, and forming the channel into a tubular configuration to mechanically bind the mixture within the sheath.

The ingredients used in the preparation of the present invention as well as those contained in currently available flux cored welding wires are well known in the welding art. Generally, the novelty of flux cored wires resides in the selection and particular combination of ingredients used in their preparation.

It has now been discovered that sound weld deposits can be prepared in nickel-chromium-iron alloys of the type containing about 15% chromium and about 8% iron through the use of a self-shielding flux cored tubular welding electrode having a novel combination of core ingredients contained within sheaths such as those prepared from, for example, nickel-chromium-iron and nickel-chromium-iron-manganese-columbium-titanium alloys.

Generally speaking, the present invention is directed to a tubular composite self-shielded arc welding electrode comprising a metallic outer sheath and a core within and enclosed by the sheath, said sheath containing, in weight percent, up to about 0.2% carbon, from about 0.1% to about 4% manganese, up to about 20% iron, from about 0.05% to about 0.75% silicon, up to about 0.6% copper, from about 10% to about 24% chromium, up to about 2% titanium, up to about 4% columbium, up to about 10% molybdenum, and the balance essentially nickel, and said core containing, in parts by weight of core ingredients, from about 2 parts to about 20 parts of at least one carbonate selected from the group consisting of calcium carbonate, strontium carbonate, and barium carbonate, from about 20 parts to about 45 parts calcium fluoride, from about 3 parts to about 15 parts of a fluoride selected from the group consisting of potassium titanium fluoride and sodium titanium fluoride, from about 2 parts to about 10 parts potassium zirconium fluoride, from about 5 parts to about 15 parts titanium oxide, from about 2 parts to about 15 parts manganese oxide, up to about 4 parts zirconium oxide, up to about 3 parts magnesium oxide, up to about 20 parts columbium, from about 0.3 parts to about 2.2 parts magnesium, up to about 15 parts manganese, up to about 10 parts chromium, up to about 25 parts molybdenum, and from about 5 parts to about 30 parts of at least one element selected from the group consisting of nickel and iron.

The ingredients contained within the metal sheath can be present in an amount from about 15% to about 60% of the weight of the sheath. The amount of contained ingredients is largely dependent upon the capabilities of the wire forming machine. It has been found that a fill of from about 20% to about 30% is preferred for 0.33mm thick strip, whereas the preferred fill can be from about 45% to about 55% for thin gage strip (e.g., 0.20mm thick strip).

The composition of the weld deposit prepared with a flux cored welding wire is largely dependent upon the composition of the metal sheath since the quantity of alloying elements that can be added through the flux core is limited to some extent by geometric considerations. In one preferred embodiment, the sheath contains, in weight percent, up to about 0.15% carbon, up to about 1% manganese, from about 6% to about 12% iron, from about 0.05% to about 0.5% silicon, from about 14% to about 18% chromium, up to about 0.6% copper, and the balance essentially nickel. In another preferred embodiment, the sheath material contains, in weight percent, up to about 0.1% carbon, at least about 2% manganese, up to about 15% iron, up to about 0.5% silicon, from about 18% to about 22% chromium, up to about 0.5% copper, from about 0.2% to about 0.75% titanium, from about 1.5 to about 3.5% columbium, and the balance essentially nickel.

The metallic and non-metallic constituents of the flux can be added in blended form as powders having a mesh size of less than 30 U.S. Standard Sieve Size or, to provide a freer flowing mixture, by blending and agglomerating through the addition of a binding agent. To illustrate, a binder, such as an aqueous 70° Baume solution of sodium or potassium silicate, can be added in an amount of about 5%, by weight, along with about 5%, by weight, of water and blended and agglomerated in a twin shell blender having an intensifier bar or in a similar device. The agglomerated powder is subsequently dried at about 290° C. and sieved to remove excessively fine (U.S. Standard Sieve Size, −325 mesh) and excessively coarse (+30 mesh) particles.

Carbonates are believed to contribute to the generation of a relatively inert shielding gas through breakdown to provide carbon dioxide. They contribute to the operating characteristics of the flux cored welding wire, function to form a protective slag covering, and contribute to desirable slag removal characteristics. Carbonates should be present in the core in an amount from about 2 to about 20 parts by weight. Although calcium carbonate ($CaCO_3$) is preferred for flux cored wires having columbium-free sheathes and strontium carbonate ($SrCO_3$) is preferred for flux cored wires having columbium-containing sheaths, barium carbonate can be substituted all or in part for these ingredients. Such substitution causes a slightly dulled bead appearance, decreases wetting and detracts slightly from slag removal characteristics. Other alkaline earth metal carbonates, in particular magnesium carbonate and lithium carbonate, cannot be substituted for calcium carbonate or stontium carbonate since this leads to deterioration in operating and slagging characteristics.

Although useful weld deposits can be prepared by using as little as 2 parts of the carbonate constituent, it is preferred that this ingredient be present in an amount above about 4 parts when using a columbium-free sheath alloy since when present in a smaller quatity, a difficult-to-remove secondary slag can form on the surface of the weld deposit. In addition, in such welds the bead appearance is dull rather than bright, and the surface of the weld deposit is subject to wrinkling. As the amount of calcium carbonate contained within the columbium-free sheath is increased, the width of the bead increases so that when present in an amount above about 12 parts, the bead width or wetting capability of the flux cored wire is not as desirable as when the flux contains a lesser amount of this ingredient, e.g., 7 parts.

When strontium carbonate is used as the carbonate component in conjuction with a columbium-containing sheath alloy, the amount of strontium carbonate in the flux should be from about 8 parts to about 18 parts to provide desirable operating characteristics and to avoid the formation of a difficult-to-remove secondary slag and dull bead appearance.

Calcium fluoride ($CaF_2$) is the primary fluoride-containing component of the flux core. This ingredient can be present in an amount from about 20 parts to about 45 parts to afford a desirable cleansing action on the surface of the base metal, for ease of slag removal and to provide highly desirable wetting characteristics. When this ingredient is present in an amount less than 20 parts, wetting and flow characteristics deteriorate. In addition, when present in an amount less than 20 parts or more than 45 parts, the weld deposits formed are subject to a centerline disturbance believed to result from solidification of the slag prior to the weld metal.

In the preferred embodiments, the calcium fluoride present in the flux core should be proportioned to the carbonate according to the following relationship in a flux containing 100 parts:

$$22 \geq CaF_2 - 2(carbonate) \geq 1$$

Wires prepared with fluxes that do not conform to the foregoing relationship and having values greater than about 22, although in other respects useful, provide somewhat more spatter than desirable during operation, and the resultant weld beads have a slightly wrinkled surface. With values below 1, the molten slag exhibits excessive wetting, a tendency exists for the formation of a tenacious secondary slag upon the surface of the weld beads, and the surface of the weld bead exhibits a slightly wrinkled appearance. Accordingly, it is highly desirable to avoid the use of fluxes having values below 1 in the aforementioned equation.

Fluxes containing from about 22 parts to about 32 parts calcium fluoride are preferred for use with sheath alloys free of columbium. In such fluxes, it is preferred that calcium carbonate be present in an amount from about 4 parts to about 12 parts. Where columbium-containing sheath alloys are used, it is preferred that calcium fluoride be used in an amount from about 30 parts to about 41 parts. The latter fillers preferably are prepared with fluxes containing strontium carbonate in an amount from about 8 parts to about 18 parts.

Potassium titanium fluoride ($K_2TiF_6$) and sodium titanium fluoride ($Na_2TiF_6$) are compounds that provide critical bead width control. They serve to spread out the weld deposit and slag covering. In addition, these ingredients aid in the prevention of secondary slag formation on high nickel alloys. At least one of these ingredients should be present in an amount from about 3 parts to about 15 parts. These ingredients also serve to provide shielding atmosphere during their transfer from the flux cored wire to the weld slag. It is preferred that potassium titanium fluoride or sodium titanium fluoride be present in an amount from about 5 to about 9 parts since when less than about 5 parts are present, there is a tendency for excessive spatter, and the surface of the weld bead exhibits a roughened appearance. Slag removal becomes more difficult with these ingredients present in an amount less than about 5 parts, as well as in amounts in excess of about 9 parts. As the amount of this ingredient is increased over about 9 parts, the weld bead begins to exhibit a dull, matte appearance which, although not objectionable in itself, is not as desirable as the shinier bead prepared with fluxes corresponding to the preferred composition.

Potassium zirconium fluoride ($K_2ZrF_6$) serves a function opposite in some respects to that described previously for sodium titanium fluoride and/or potassium titanium fluoride in that increasing proportions of this component reduce the width of the weld deposit and slag. This ingredient should be present in an amount from about 2 to about 10 parts. When added in an amount less than about 2 parts, weld deposits exhibit a disturbed or orange peel appearance, and a difficult-to-remove secondary slag forms. When more than about 10 parts of potassium zirconium fluoride are added to the flux, the width of the weld deposit is reduced excessively, and the weld deposit exhibits a disturbed or orange peel appearance. Preferably, this ingredient should be present in an amount from about 4 parts to about 9 parts to provide a uniform appearing bead of desirable width and height and to substantially limit the disturbed surface appearance. In preferred embodiments, potassium titanium fluoride, sodium titanium fluoride, and potassium zirconium fluoride are present in a total above about 10 parts. The flux of the present invention should not contain other fluorides (e.g., cryolite, lithium fluoride, etc.) substituted in part for or in addition to calcium fluoride, potassium titanium fluoride, sodium titanium fluoride, and potassium zirconium fluoride. Such substitution or addition causes substantial deterioration in operational, bead appearance, and slag removal characteristics.

Zirconia ($ZrO_2$) is added to raise the melting point, thereby changing the melting characteristics of the slag. Zirconia also improves slag release characteristics and bead appearance. This ingredient is generally useful as a trimming addition. Zirconia may be added in an amount up to about 4 parts. Additions in excess of 4 parts lead to excessively high slag melting temperatures and reduced fluidity. It is preferred that zirconia be added in an amount from about 0.5 parts to about 3 parts.

A small quantity of magnesium oxide (MgO) can be added to the flux to improve slag removal characteristics, particularly where the flux cored wire is used to prepare weld deposits on steel. Additions in excess of about 3 parts do not provide further benefit. It is preferred that from about 0.5 to about 1.5 parts of magnesia be present in the flux.

Titania ($TiO_2$) is contained within the flux core in an amount from about 5 to about 15 parts and functions as an arc stabilizer, slag former, and aids in imparting desirable slag removal characteristics. This compound (e.g., which can be added as rutile) contributes to the uniformity of the slag and should be present in an amount above about 5% for this purpose. Although titania in amounts in excess of 15% improves slag removal characteristics when used to weld steel, the appearance of weld deposits is not satisfactory in nickel-chromium-iron alloys due to the dull and wrinkled appearance of the weld deposit. It is preferred that titania be present in an amount from about 6 parts to about 12 parts to afford both uniform slag coverage and bead appearance.

Manganese oxide ($Mn_3O_4$) is largely responsible for the shiny appearance of weld deposits and functions primarily as a slag-forming ingredient. In addition, reduction of some of this compound during welding serves to increase the manganese content of the weld deposit. When present in an amount less than about 2 parts, the slag that forms is thin at its center and considerably less fluid. Also, such weld beads have a dull appearance and are subject to wrinkling. As the manganese oxide content is increased, slag removal becomes easier, and it is preferred that manganese oxide be present in an amount above about 3 parts. When present in an amount in excess of 15 parts, a convex weld bead having heavy slag buildup at its edges results with consequent difficulty in slag removal, particularly in a grooved joint. Preferably, not more than about 13 parts of manganese oxide should be present in the flux.

Columbium (generally including some tantalum) is added to provide resistance to weld cracking and to increase the ultimate tensile strength of welds. Columbium can be added through the flux, as well as through the sheath alloy. The addition level for the flux core can be adjusted downward to accommodate the columbium content of the sheath so that the weld deposit does not contain more than about 8%, by weight, columbium and preferably not more than about 7%. Sufficient columbium should be contained within the sheath, the flux, or both, to provide at least about 0.5% columbium, and preferably at least about 1% columbium, in the weld deposit.

In the flux, as much as about 20 parts of columbium have been found useful for providing weld soundness under conditions imposing high restraint. A nickel-60% columbium master alloy in the form of a −40 mesh powder has been found to be useful in the practice of this invention. Other columbium-containing master alloys, e.g., chromium-columbium, iron-columbium, etc., as well as columbium powder, can be substituted for the nickel-columbium master alloy.

In working with a particular sheath allow, it has been found useful to describe the broad sheath alloy and flux core requirements for columbium as follows:

$$8 > 0.55(\text{Cb in sheath}) + 0.43(\text{Cb in core}) > 0.5$$

where the columbium in the sheath is expressed in weight percent and the columbium in the core is expressed in the number of parts in a 100-part flux.

In preferred flux-cored filler wires, the columbium requirement is defined as follows:

$$7 > 0.55(\text{Cb in sheath}) + 0.43(\text{Cb in core}) > 1.0.$$

In addition to columbium's role as a crack-preventing additive, it also influences the operational characteristics of the welding material. For example, in filler wires prepared with a columbium-free nickel-chromium-iron alloy sheath, it is preferred that this ingredient be present in the welding flux in an amount from about 6 parts to about 18 parts, since the appearance of a weld bead prepared with a flux cored electrode containing less than about 6 parts of columbium is characterized by dull bead appearance. Also, the slag removal characteristics are somewhat poorer with this filler than with one made with a flux core corresponding to the preferred composition range. The poorer slag removal characteristics were observed in welded nickel-chromium-iron alloy joints; however, weld overlays prepared with this same welding material on steel had somewhat improved slag removal characteristics. This anomalous behavior was also observed in weld deposits prepared with flux cored wires containing about 20 parts of columbium. However, with this filler wire it was also found that the amount of spatter increased. Consideration of these particular operating qualities is responsible for the selection of the preferred range for columbium.

Magnesium is added to the flux core to provide deoxidation of the weld deposit, to promote a spray-type transfer, and to reduce spatter. Magnesium serves to scavenge metal oxides formed during the welding operation. In the oxidized state, this ingredient floats to the surface of the weld pool and is removed with the slag. Because of the high reactivity of magnesium, it is necessarily added as a master alloy. A nickel-15% magnesium alloy is preferred for this purpose. Also, it should be recognized that certain other magnesium alloys can be used. Nickel-magnesium alloys containing lesser and greater amounts of magnesium, e.g., 5% Mg, 50% Mg, etc., can be substituted for the nickel-15% magnesium alloy to provide the required deoxidation. Weld deposits prepared without a magnesium addition have a dull surface appearance with only fair slag removal characteristics, and such deposits are undesirable from this standpoint alone. In addition, such weld deposits are susceptible to cracking. Consequently, a minimum of about 0.3 parts of magnesium (2 parts of a nickel-15% magnesium alloy) should be contained within the flux core to provide useful deoxidizing capability. More than about 2.2 parts of magnesium (15 parts of a nickel-15% magnesium alloy) should not be added to the flux core since difficulty in slag removal will result. Also, excessive quantities of magnesium can be transferred to the weld deposit and will impart susceptibility to cracking, particularly in heavy section welds. Weld deposits containing more than about 0.1% magnesium and even more than about 0.06% magnesium can exhibit such susceptibility. For these same reasons, it is preferred that from about 0.4 parts to about 1.8 parts of magnesium (about 2.7 to about 12 parts of a nickel-15% magnesium alloy) be contained within the flux core. Flux cored wires having magnesium present within this range provide the preferred combination of deoxidation capability and operational characteristics.

Manganese can be added to the flux core to improve the resistance of weld deposits to weld cracking. However, additions in excess of about 15 parts cause difficult slag removal due to the formation of a secondary slag upon the surface of the weld deposit. Weld deposits free of this ingredient exhibit a dull, matte finish, whereas the addition of a small amount of manganese serves to promote a bead appearance that is shiny and clean. When a sheath alloy containing less than about 1% manganese is used, it is preferred that from about 2 parts to about 12 parts of manganese be present in the flux core to promote cleanliness on the surface of the weld deposit, to provide additional weld cracking resistance, and to avoid the formation of a secondary slag with consequent difficulty in slag removal. Manganese can also be added through the sheath alloy in amounts of up to about 4%. Addition in this manner provides essentially the same benefits as those provided by addition through the flux. It is preferred that sufficient manganese be present in the core and/or sheath alloy to provide at least about 1% manganese in the weld deposit.

Chromium is generally added to the flux core for the purpose of maintaining the chromium content of the weld deposit, particularly in flux cored wires having about 15% chromium in the sheath, since a small amount of this ingredient is oxidized during transfer across the welding arc and thereby removed from the weld pool. Weld deposits prepared with cored wires having chromium-free fluxes exhibit essentially the same operating characteristics as those to which chromium powder has been added. Generally, not more than about 10 parts of chromium are added to the flux core since slag removal becomes difficult and the weld surface has a dull appearance with such larger quantities. For these same reasons, it is preferred that no more than about 8 parts of chromium be present in the flux core.

To provide substantial increases in elevated temperature properties as well as improved corrosion resistance, in some instances, it can be advantageous to add molybdenum to the weld deposit through the flux. (Molybdenum can also be contained in the sheath alloy in an amount up to about 10%.) When molybdenum is added through the flux, and addition to the flux of up to about 25 parts has been found to be useful. Molybdenum can be added to the flux as molybdenum powder or as a master alloy (e.g., ferromolybdenum).

The balance of the flux core ingredients consists of nickel, iron, or other elements from the master alloys (e.g., Fe—60% Cb, Ni—15% Mg, etc.) although these can be added as elemental powders to alter deposit composition to some extent. Generally, the amount of nickel or other metallic elements present in the flux core will be from about 5 to about 30 parts.

Weld deposits can be prepared with the aforedescribed fluxes contained within a variety of sheath alloys. Such weld deposits generally provide compositions within the approximate broad range of, in weight percent, up to about 0.2% carbon, from about 1% to about 6% manganese, up to about 25% iron, from about 0.05% to about 0.6% silicon, up to about 0.6% copper, from about 10% to about 30% chromium, up to about 2% titanium, up to about 8% columbium, up to about 10% molybdenum, up to about 0.1% magnesium, less than about 0.02% each of phosphorus and sulfur, and the balance essentially nickel. Weld deposits representing one of the preferred flux/sheath combinations can contain, in weight percent, up to about 0.1% carbon, from about 1% to about 6% manganese, up to about 15% iron, from about 0.05% to about 0.6% silicon, up to about 0.6% copper, from about 12% to about 25% chromium, up to about 0.75% titanium, from about 2% to about 6% columbium, up to about 0.06% magnesium, less than about 0.015% each of phosphorus and sulfur, and the balance essentially nickel.

For the purpose of giving those skilled in the art a better understanding of the invention and/or a better appreciation of the advantages of the invention, the following illustrative examples are given:

EXAMPLES

Flux No. 1, having the composition shown in Table I, was prepared from a 45.3 kg charge, whereas Flux Nos. 2–21, A and B were prepared from 450 gram charges. The ingredients used to prepare these fluxes were sieved to provide particle sizes smaller than 30 and greater than 325 U.S. Standard Sieve Size. Following weighing, the charges were blended in a twin shell blender. Flux No. 1 was blended for about 30 minutes and the other fluxes for about 5 minutes.

The blended powders were placed in the hopper of a commercial Yoder mill adapted for forming strip into flux cored wire. 10 mm wide × 0.33 mm thick strip of the 16% Cr, 8% Fe, Bal. Ni alloy and 10 mm wide × 0.25 mm thick strip of the 20% Cr, 3% Mn, 2.5% Cb, 0.5% Ti, Bal. Ni alloy (hereinafter referred to as the columbium-containing sheath) having the compositions shown in Table II were formed into 3.2 mm diameter which was cold drawn to 2.7 mm diameter to mechanically retain the powder within the formed strip. Wires prepared in this manner were used for the examples described herein. In addition, small quantities of

TABLE I

| | | FLUX COMPOSITIONS IN PARTS BY WEIGHT | | | | | | | | | | | | | |
|---|---|---|---|---|---|---|---|---|---|---|---|---|---|---|---|
| Flux No. | Sheath No. | $CaCO_3$ | $SrCO_3$ | $CaF_2$ | $K_2TiF_6$ | $Na_2TiF_6$ | $K_2ZrF_6$ | $TiO_2$ | $Mn_3O_4$ | $ZrO_4$ | MgO | Ni-60% Cb | Ni-15% Mg | Mn | Cr | Others |
| | | | | | | Ni—Cr—Fe Sheath | | | | | | | | | | |
| 1 | 1 | 7 | | 27 | | 7 | 5 | 10 | 5 | 2 | 1 | 24 | 4 | 4 | 4 | |
| 2 | 2 | 5 | 5 | 25 | 7 | | 5 | 10 | 5 | | | 20 | 10 | 4 | 4 | |
| 3 | 2 | 5 | 3 | 31 | 7 | | 5 | 10 | 5 | | | 10 | 10 | 4 | $10^3$ | |
| 4 | 2 | 5 | 3 | 23 | 7 | | 5 | 10 | 5 | | | 10 | 10 | 12 | $10^3$ | |
| 5 | 1 | 7 | | 23 | | 7 | 5 | 10 | 5 | 2 | 1 | 24 | 8 | 4 | 4 | |
| 6 | 1 | 7 | | 31 | | 7 | 5 | 10 | 5 | 2 | 1 | 24 | 4 | 0 | 4 | |
| 7 | 1 | 8 | | 32 | | 5 | 3 | 10 | 6 | 2 | 1 | 21 | 4 | 4 | 4 | |
| 8 | 1 | 4 | 3 | 27 | | 7 | 5 | 10 | 5 | 2 | 1 | 24 | 4 | 4 | 4 | |
| 9 | 1 | | 7 | 27 | | 7 | 5 | 10 | 5 | 2 | 1 | 24 | 4 | 4 | 4 | |
| 10 | 1 | | | 27 | | 7 | 5 | 10 | 5 | 2 | 1 | 24 | 4 | 4 | 4 | 7 $BaCO_3$ |
| 11 | 1 | 7 | | 27 | 7 | | 5 | 10 | 5 | 2 | 1 | 24 | 4 | 4 | 4 | |
| 12 | 1 | 12 | | 22 | | 7 | 5 | 10 | 5 | 2 | 1 | 24 | 4 | 4 | 4 | |
| 13 | 2 | 5 | 5 | 24 | 7 | | 5 | 10 | 5 | | | 5 | 10 | 5 | 4 | 15 Mo |
| A | 1 | 7 | | 31 | | 7 | 5 | 10 | 5 | 2 | 1 | 24 | 0 | 4 | 4 | |
| | | | | | | Cb-Containing Sheath | | | | | | | | | | |
| 14 | 3 | | 12 | 38 | | 5 | 8 | 12 | 10 | 2 | | $3^1$ | 5 | | $5^4$ | |
| 15 | 3 | | 15 | 33 | | 5 | 8 | 12 | 12 | 2 | | $3^1$ | 5 | | $5^4$ | |
| 16 | 3 | | 15 | 34 | 8 | | 8 | 10 | 10 | 2 | | $3^1$ | 5 | | $5^4$ | |
| 17 | 3 | | 15 | 32 | | 5 | 8 | 15 | 10 | 2 | | $3^1$ | 5 | $5^4$ | | |

TABLE I-continued

FLUX COMPOSITIONS IN PARTS BY WEIGHT

| Flux No. | Sheath No. | CaCO$_3$ | SrCO$_3$ | CaF$_2$ | K$_2$TiF$_6$ | Na$_2$TiF$_6$ | K$_2$ZrF$_6$ | TiO$_2$ | Mn$_3$O$_4$ | ZrO$_4$ | MgO | Ni-60% Cb | Ni-15% Mg | Mn | Cr | Others |
|---|---|---|---|---|---|---|---|---|---|---|---|---|---|---|---|---|
| 18 | 3 | | | 7 | 30 | 5 | 5 | 9 | 10 | | | 4[2] | 4 | 2 | | 20 Ni, 4 FE |
| 19 | 3 | | | 7 | 38 | 5 | 5 | 9 | 10 | | | 2[1] | 4 | 2 | 3 | 15 Ni |
| 20 | 3 | | | 8 | 38 | 5 | 7 | 10 | 5 | 3 | | 2[1] | 6 | | 4 | 12 Ni |
| 21 | 3 | 10 | | | 40 | 10 | 7 | 15 | 7 | 3 | 2 | | 6 | | | |
| B | 3 | | 12 | 26 | | 5 | 8 | 12 | 10 | 2 | | 3[1] | 5 | | 5[4] | 12 LiF |

[1] Cb added as Fe-60%Cb
[2] Cb added as Cr-60%Cb
[3] Cr added as Cr-60%Cb
[4] Cr added as Fe-68%Cr representative samples were drawn through conventional drawing dies to provide wires having diameters of about 2.4 and 1.6 mm. Flux cored wires of 2.7 mm diameter prepared in the aforedescribed manner were used to prepare weld deposits as described below using the automatic gas metal-arc welding process.

The operating characteristics of the flux cored wires, of the compositions shown in Table I, were examined by preparing weld deposits in 2 cm thick, 70° V-groove joints in a 15% chromium, 8% iron, balance nickel alloy. In addition, weld beads were prepared on the surface of mild steel plates. A current of 350 amperes, 31 volts, and a travel speed of 38 cm per minute were used. The gas metal-arc unit was operated with a contact tip to work spacing of 1.9 cm. Shielding was supplied entirely by decomposition of the flux cored welding wire.

The calcium carbonate containing flux, No. 1 in Table I, represents a preferred combination of flux ingredients with a nickel-chromium-iron alloy sheath. The operation of this flux cored wire was excellent in all respects. The filler wire was characterized by ease of starting, and a weld pool was readily established. There was no noticeable wandering of the welding arc which demonstrated the excellent arc stability of this flux cored wire. The slag that formed upon the surface of the completed weld deposit was substantially self-removing. A small area of adherent slag in the vicinity of the weld crater was readily removed by relatively light hammer blows to the plate surface. The resultant weld deposit had a shiny appearance, and there was no residual primary or secondary slag.

Flux Nos. 2, 3, and 4, also prepared with a 15% Cr, 8% Fe, balance Ni sheath, contained SrCO$_3$ partially substituted for CaCO$_3$. Due to this substitution as well as the lack of the zirconia and magnesia trimming additions, these cored wires did not perform quite as satisfactorily as Flux No. 1, even though they were of commercially useful quality. These fluxes also contained K$_2$TiF$_6$ in place of Na$_2$TiF$_6$, and Flux No. 4 contained 12 parts of manganese.

Flux Nos. 5, 6, and 7 were also contained within a 15% Cr, 8% Fe, balance nickel alloy sheath and represented variations from the preferred composition. These fluxes afforded essentially identical operational and slag removal characteristics as those exhibited by the preferred flux composition. Flux No. 5 contained 8 parts of the nickel, 15%-magnesium master alloy rather than 4 parts as in Flux 1. Flux 6 was free of the manganese addition and had more calcium fluoride than Flux No. 1. Flux No. 7 had more calcium fluoride than Flux No. 1 and lower levels of sodium titanium fluoride and potassium zirconium fluoride.

Flux No. 8 in Table I was essentially the same as Flux No. 1 except that three parts of strontium carbonate were substituted for part of the calcium carbonate. Flux No. 9 contained total substitution of strontium carbonate for calcium carbonate. The weld deposits prepared with the wires containing Flux Nos. 8 and 9 were of desirable quality, and the operational characteristics were not markedly different from those of Flux No. 1, although the effort required to remove the slag from the surface of the weld deposits was somewhat greater than that required for removing the slag from weld deposits prepared with Flux No. 1 containing all calcium carbonate. Even though the slag could be readily removed, removal required the use of a chipping-chisel and hammer. This somewhat more difficult slag removal procedure was associated with a somewhat dulled bead appearance.

In Flux No. 10, seven parts of barium carbonate were used in place of seven parts of calcium carbonate. This substitution reduced the wetting characteristics of the wire to a small extent, increased the difficulty of slag removal, and resulted in a dull bead appearance. The appearance of weld deposits prepared with barium carbonate substituted for calcium carbonate were rated as slightly inferior to weld deposits prepared with strontium carbonate substituted for the calcium carbonate. Nevertheless, the operating and slag removal characteristics of these fillers were considered commercially useful.

Flux No. 11 in Table I had the same composition as Flux No. 1 except that potassium titanium fluoride was substituted for sodium titanium fluoride (and in this respect was similar to Flux Nos. 2, 3, and 4). There was no discernible difference between the operational or slag removal characteristics of the weld deposit prepared with the flux cored wire containing K$_2$TiF$_6$ in place of Na$_2$TiF$_6$.

Flux 12, also within the broad composition range but outside the preferred composition range due to the presence of insufficient calcium fluoride for the amount of calcium carbonate present (i.e., CaF$_2$ - 2(carbonate) = -2), exhibited a somewhat more fluid slag than desirable. The resultant bead, although of commercial quality, showed some wrinkling of its surface and traces of a secondary slag near the edges of the bead.

Molybdenum was added to Flux No. 13 as 15 parts of molybdenum powder. This addition did not adversely affect the operating characteristics of a nickel-chromium-iron alloy sheathed filler wire. Weld No. 5 prepared with this filler contained 4.88% molybdenum (Table II).

Flux A was outside the present invention since it did not contain a magnesium addition. Weld beads prepared with a wire containing this flux had undesirable slag removal characteristics, and the beads had a dull surface appearance.

Flux Nos. 14 through 17 in Table I are representative of preferred embodiments of the flux compositions used in conjunction with a columbium-containing sheath alloy. Flux No. 14 is considered to provide the most highly desirable combination of characteristics including a stable arc, minimal spatter, self-removing slag, good bead appearance, and weld soundness. Welds prepared with fillers containing Flux Nos. 15 through 17, although equivalent in many respects to Flux No. 14 and of acceptable commercial quality, exhibited some cosmetic irregularities on the surface of weld beads.

Flux No. 18 contains intentional nickel and iron powder additions and a chromium-60% columbium master alloy. Welds prepared with this cored wire had a thinner slag coating than desired and slight cosmetic irregularities along the weld centerline. However, in all other respects, the wire provided equivalent performance to that of flux cored wires of the preferred composition.

Flux No. 19 is within the broad composition range but outside the preferred composition range due to the presence of excessive calcium fluoride for the quantity of carbonate present (i.e., $CaF_2 - 2(carbonate) = 24$). Weld beads prepared with this flux in a Cb-containing alloy sheath exhibited somewhat more weld spatter (i.e., expulsion of molten droplets from the arc stream and weld deposit) than desirable, and the surface of the beads had a slightly wrinkled appearance. Flux No. 20 was very similar in composition to Flux No. 19 and provided improved operating characteristics; however, slag removal was not quite as good as that of cored wires prepared with a most preferred flux, such as Flux No. 14.

Substitution of $CaCO_3$ for $SrCO_3$ in Flux No. 21, sheathed in a columbium-containing alloy, provided operational characteristics and bead appearance that were not as desirable as those provided by Flux No. 14. In addition, the slag formed upon the surface of weld beads exhibited out-gassing with consequent bubble formation leading to cosmetic discontinuities on the weld bead surface. Consequently, the use of $SrCO_3$ is preferred for filler wires prepared with a Cb-containing alloy sheath.

Lithium fluoride was substituted in part for calcium fluoride in Flux B. This substitution led to excessive spatter during operation of the flux cored wire, and the solidified weld beads exhibited severe disturbances along their centerlines. This example showed that fluorides other than those specified herein should not be substituted within the flux of the present invention.

Flux Nos. 1-4 in Table I, representative of preferred flux compositions and contained within Ni-Cr-Fe sheaths of a preferred composition (sheath Alloy No. 1 in Table II), were used to prepare 2 cm thick butt joints between two plates of the 15% chromium, 8% iron, balance nickel alloy having the composition shown for Base Plate A in Table II. The plates were 7.6 cm wide × 20 cm long, and one of the 20 cm faces was beveled at a 35° angle. The plates were placed upon 6 mm thick × 4.4 cm wide × 21.6 cm long backing straps. The plates were set apart 1 cm and heavily restrained by clamping to a 10 cm thick copper-faced steel platen.

The 2.7 mm diameter flux cored wires were deposited in the V-grooves formed between the plates using an automatic gas metal-arc welding unit. Weld Nos. 1-4 were prepared using 300 amperes Direct Current Reversed Polarity, 30 volts, and travel speeds ranging from 15 to 45 cm per minute. The distance between the contact tip and the work piece was 2 cm for all passes. A total of 8 passes was required to complete the joints. The shielding atmosphere was provided by the flux cored welding wire without the need for or use of supplemental shielding gas.

The slag that formed as a result of the welding operation self-removed to a large extent, and any residual, e.g., in the vicinity of the weld crater, was easily removed by light hammer blows. The surfaces of the weld deposits were smooth, shiny, and free from any adhering secondary slag. The chemical compositions of representative weld deposits are shown in Table II.

TABLE II

| | | | COMPOSITION OF CORE WIRES, WELD DEPOSIT AND BASE PLATE | | | | | | | | | | |
|---|---|---|---|---|---|---|---|---|---|---|---|---|---|
| Flux No. | Sheath No. | Welded Joint No. | C | Mn | Si | Cr | Fe | Cu | Ti | Cb | Mg | Mo | S | P |
| | 1 | | 0.02 | 0.24 | 0.11 | 15.0 | 9.18 | 0.37 | | | | | | |
| | 2 | | 0.03 | 0.37 | 0.13 | 16.3 | 8.21 | 0.39 | | | | | | |
| | 3 | | 0.02 | 2.86 | 0.16 | 18.9 | 2.88 | 0.09 | 0.37 | 2.43 | | | | |
| 1 | 1 | 1 | 0.04 | 2.84 | 0.13 | 14.0 | 7.81 | 0.36 | 0.09 | 6.21 | 0.002 | 0.18 | 0.014 | 0.004 |
| 2 | 2 | 2 | 0.01 | 1.93 | 0.14 | 15.4 | 7.49 | 0.35 | 0.10 | 3.42 | 0.014 | 0.18 | 0.012 | 0.004 |
| 3 | 2 | 3 | 0.06 | 1.80 | 0.17 | 16.4 | 7.70 | 0.36 | 0.10 | 2.29 | 0.012 | 0.20 | 0.013 | 0.004 |
| 4 | 2 | 4 | 0.04 | 5.70 | 0.10 | 15.3 | 7.72 | 0.34 | 0.08 | 3.50 | 0.015 | 0.17 | 0.013 | 0.004 |
| 5 | 1 | | 0.055 | 2.90 | 0.14 | 13.9 | 7.62 | 0.34 | 0.12 | 6.53 | 0.007 | 0.18 | 0.012 | 0.004 |
| 6 | 1 | | 0.034 | 2.81 | 0.12 | 12.5 | 8.01 | 0.35 | 0.09 | 6.25 | 0.004 | 0.18 | 0.013 | 0.004 |
| 7 | 1 | | 0.039 | 3.21 | 0.10 | 14.3 | 7.89 | 0.35 | 0.07 | 6.14 | 0.001 | 0.18 | 0.014 | 0.004 |
| 8 | 1 | | 0.032 | 2.71 | 0.13 | 14.1 | 7.84 | 0.34 | 0.09 | 6.17 | 0.004 | 0.18 | 0.013 | 0.004 |
| 9 | 1 | | 0.034 | 2.66 | 0.13 | 13.9 | 7.85 | 0.35 | 0.10 | 6.53 | 0.005 | 0.19 | 0.015 | 0.004 |
| 10 | 1 | | 0.033 | 2.58 | 0.13 | 14.0 | 7.96 | 0.37 | 0.10 | 6.08 | 0.005 | 0.18 | 0.014 | 0.004 |
| 11 | 1 | | 0.035 | 2.85 | 0.13 | 14.0 | 7.81 | 0.35 | 0.09 | 6.28 | 0.006 | 0.18 | 0.013 | 0.004 |
| 12 | 1 | | 0.034 | 2.75 | 0.10 | 14.2 | 7.90 | 0.35 | 0.08 | 5.73 | 0.002 | 0.18 | 0.011 | 0.004 |
| 13 | 2 | 5 | 0.08 | 2.36 | 0.10 | 15.4 | 7.37 | | 0.11 | 0.98 | 0.001 | 4.88 | 0.010 | |
| A | 1 | | 0.001 | 2.47 | 0.17 | 14.2 | 8.13 | 0.35 | 0.07 | 5.77 | 0.0001 | 0.18 | 0.006 | 0.004 |
| 14 | 3 | 6 | 0.035 | 3.88 | 0.15 | 18.6 | 3.70 | 0.10 | 0.08 | 2.26 | 0.005 | 0.04 | 0.013 | 0.004 |
| 15 | 3 | | 0.035 | 4.23 | 0.13 | 18.5 | 3.78 | 0.12 | 0.07 | 2.17 | 0.004 | 0.04 | 0.013 | 0.004 |
| 16 | 3 | 7 | 0.035 | 3.88 | 0.15 | 18.7 | 3.80 | 0.10 | 0.08 | 2.37 | 0.005 | 0.04 | 0.013 | 0.004 |
| 17 | 3 | | 0.036 | 3.85 | 0.14 | 18.5 | 3.77 | 0.10 | 0.08 | 2.32 | 0.006 | 0.04 | 0.013 | 0.004 |
| 18 | 3 | 8 | 0.035 | 4.62 | 0.11 | 16.5 | 4.35 | 0.08 | 0.07 | 1.87 | 0.003 | 0.04 | 0.013 | 0.004 |
| 19 | 3 | 9 | 0.034 | 4.60 | 0.12 | 17.4 | 2.97 | 0.09 | 0.07 | 2.10 | 0.004 | 0.04 | 0.014 | 0.004 |
| 20 | 3 | 10 | 0.035 | 3.13 | 0.17 | 18.2 | 2.96 | 0.10 | 0.10 | 2.36 | 0.004 | 0.04 | 0.013 | 0.004 |
| 21 | 3 | 11 | 0.05 | 1.92 | 0.17 | 16.1 | 5.17 | 0.20 | 0.20 | 1.34 | 0.003 | 0.10 | | |
| Base Plate A | | | 0.08 | 0.25 | 0.16 | 15.4 | 8.14 | | | 0.37 | | | | |

Two 1 cm thick transverse slices were cut from each weld deposit (Weld Nos. 1-4 in Table III), ground, polished, and etched with Lepito's reagent. The four faces of these slices from each weld were examined at 10 magnifications and found to be free from defects. The transverse slices were bent 180° about a 3.8 cm diameter pin. Microscopic examination at 10 magnifications revealed the presence of two small cracks that were less than 1.6 mm long in Weld Nos. 1-3 and two cracks that were less than 0.8 mm long in Weld No. 4 which represent acceptable levels of weld soundness.

All-weld-metal tensile specimens prepared from these joints were tested at room temperature. As shown in Table III, the yield strength, ultimate tensile strength, elongation, and reduction in area values were comparable to those properties typically obtained in the annealed, wrought 15% chromium, 8% iron, balance nickel plate. This demonstrated the tensile compatibility of the flux cored filler wires with their intended base plate alloy.

Weld No. 5 in Table III was prepared in 2 cm thick Ni-Cr-Fe Base Plate A in the manner described previously for Weld Nos. 1-4 using a filler having a nickel-chromium-iron sheath and the molybdenum powder containing Flux No. 5. The addition of molybdenum increased the yield strength of the weld deposit (Table III).

A 2 cm thick butt joint, Weld No. 6 in Table III, was prepared with a filler wire having the preferred flux, No. 14, sheathed within a columbium-containing alloy using the conditions described previously for Weld Nos. 1-4.

20 cm long, and one 20 cm edge of each plate was machined to provide a 70° V-bevel. The joints were separated by 6 mm on a 6 mm thick × 5 cm wide backing strap. The weld required 8 passes using the welding conditions described previously.

Microscopic examination of polished and etched transverse slices showed freedom from cracking and other weld defects. Transverse bend slices showed an acceptable level of cracking, two cracks/section with crack length less than about 1.6 mm after bending 180° about a 3.8 cm diameter pin. This illustrated the capability of the flux cored wire for joining the Ni-Cr-Fe alloy to dissimilar alloys.

Flux No. 14 was used to prepare a weld overlay, Weld No. 13 in Table III, upon the surface of an S.A.E. 1020 steel. The 10 cm thick × 18 cm wide × 25 cm long steel blocks were surface ground on one of the 18 cm × 25 cm faces. Weld beads were run in the 25 cm direction using the automatic gas metal-arc welding process without shielding gas. The overlay was 6 beads wide and 3 layers high. Welding was conducted at an amperage of 300, with a voltage of 30 and a travel speed of 18 cm per minute. The head of the welding machine was oscillated at the rate of 50 oscillations per minute to provide a bead about 3.8 cm wide. The passes overlapped by about 1/3.

The surface of the completed overlay was die penetrant inspected and found to be free from weld defects. Further examination consisted of the preparation and testing of ground, polished, and etched transverse side

TABLE III

| | | | SOUNDNESS AND TENSILE PROPERTIES OF WELD DEPOSITS | | | | | |
|---|---|---|---|---|---|---|---|---|
| | | | Cracks Per Section | | Tensile Properties | | | |
| Welded Joint No. | Flux No. | Sheath No. | Transverse Slices | Bend Test 1 | 0.2% Y.S., .N/mm$^2$ | U.T.S., N/mm$^2$ | Elong. (5.1cm) % | R.A., % |
| 1 | 1 | 1 | 0 | 2 (<1.6mm) | 376.4 | 690.2 | 42.5 | 44.8 |
| 2 | 2 | 2 | 0 | 2 (<1.6mm) | 353.0 | 663.3 | 41.0 | 41.6 |
| 3 | 3 | 2 | 0 | 2 (<1.6mm) | 325.4 | 635.7 | 41.0 | 39.0 |
| 4 | 4 | 2 | 0 | 2 (<0.8mm) | 328.9 | 642.6 | 43.0 | 48.0 |
| 5 | 13 | 2 | 0 | 2 (<1.6mm) | 382.7 | 628.1 | 23.0 | 27.2 |
| 6 | 14 | 3 | 0 | 2 (<1.6mm) | 354.4 | 649.5 | 46.0 | |
| 7 | 16 | 3 | 0 | 0 | 344.7 | 637.1 | 40.0 | |
| 8 | 18 | 3 | 0 | 0 | 357.1 | 626.7 | 33.5 | 32.2 |
| 9 | 19 | 3 | 0 | 1 (<1.6mm) | 353.7 | 619.1 | 27.5 | 26.2 |
| 10 | 20 | 3 | 0 | 0 | 350.2 | 646.7 | 39.5 | 41.0 |
| 11 | 21 | 3 | 0 | | 350.9 | 632.9 | 40.5 | |
| 12 | 16 | 3 | 0 | 2 (<1.6mm) | 344.7 | 637.1 | 40.0 | 42.2 |
| 13 | 14 | 3 | 0 | 0 | | | | |
| Annealed Ni-Cr-Fe Alloy Plate (Typical) | | | | | 275 | 635 | 40 | 42 |

[1] First number shows the number of cracks per section, and figure in parenthesis shows maximum crack length.

Microscopic examination of polished and etched transverse slices showed freedom from cracking and other defects. Bend specimens showed only two cracks/section that were less than about 1.6 mm long demonstrating the excellent soundness of this weld deposit. Weld Nos. 7 through 11 prepared with fluxes that were not necessarily representative of the preferred flux for a columbium-containing alloy sheath, but within the broad invention, all demonstrated excellent weld soundness. Weld Nos. 6 through 11 provided tensile properties compatible with the tensile properties of the base alloy.

A welded joint, No. 12 in Table III, was prepared to illustrate the usefulness of the flux cored wire of this invention for preparing dissimilar welds. The weld was prepared between the 15% chromium, 8% iron, balance nickel alloy and S.A.E. 1020 steel with the flux cored wire having Flux No. 16 in Table I and the formed strip having the composition shown for Sheath No. 3 in Table II. The plates were 2 cm thick × 7.6 cm wide × and face bend specimens. The 1 cm thick sections were bent 180° about a 3.8 cm diameter pin and found to be free from weld defects. The top-most layer of the overlay contained 0.034% C, 3.41% Mn, 0.15% Si, 18.5% Cr, 5.06% Fe, 0.10% Cu, 0.04% Al, 0.12% Ti, 2.38% Cb, 0.006% Mg. 0.04% Mo, Bal. Ni.

This overlay demonstrated the tolerance of the flux cored wire of this invention for the preparation of weld overlays and further illustrated the tolerance for high iron dilution.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A tubular composite self-shielded arc welding electrode comprising: a metallic outer sheath and a core within and enclosed by the sheath, said sheath containing, in weight percent, up to about 0.2% carbon, from about 0.1% to about 4% manganese, up to about 20% iron, from about 0.05% to about 0.75% silicon, up to about 0.6% copper, from about 10% to about 24% chromium, up to about 2% titanium, up to about 4% columbium, up to about 10% molybdenum, and the balance essentially nickel, and said core containing, in parts by weight of core ingredients, from about 2 parts to about 20 parts of a carbonate selected from the group consisting of calcium carbonate, strontium carbonate, and barium carbonate, from about 20 parts to about 45 parts calcium fluoride, from about 3 parts to about 15 parts of a fluoride selected from the group consisting of potassium titanium fluoride and sodium titanium fluoride, from about 2 parts to about 10 parts potassium zirconium fluoride, from about 5 parts to about 15 parts titanium oxide, from about 2 parts to about 15 parts manganese oxide, up to about 4 parts zirconium oxide, up to about 3 parts magnesium oxide, up to about 20 parts columbium, from about 0.3 parts to about 2.2 parts magnesium, up to about 15 parts manganese, up to about 10 parts chromium, up to about 25 parts molybdenum, and from about 5 parts to about 30 parts of at least one element selected from the group consisting of nickel and iron.

2. A welding electrode as defined in claim 1, wherein said core is from about 15% to about 60% of the weight of said sheath.

3. A welding electrode as defined in claim 1, wherein said calcium fluoride and said carbonate have the relationship $$22 > CaF_2 - 2(carbonate) > 1.$$

4. A welding electrode as defined in claim 3, wherein said columbium enclosed by said sheath and said columbium contained in said core have the relationship $$8 > 0.55(Cb\ in\ sheath) + 0.43(Cb\ in\ core) > 0.5.$$

5. A welding electrode as defined in claim 4, wherein calcium fluoride is present in an amount from about 22 parts to about 32 parts and said carbonate is present in an amount from about 4 parts to about 12 parts.

6. A welding electrode as defined in claim 5, wherein said metallic outer sheath contains up to about 0.15% carbon, up to about 1% manganese, from about 6% to about 12% iron, from about 0.05% to about 0.5% silicon, up to about 0.6% copper, from about 14% to about 18% chromium, and the balance essentially nickel.

7. A welding electrode as defined in claim 6, wherein said carbonate is calcium carbonate.

8. A welding electrode as defined in claim 7, wherein said core contains from about 6 parts to about 18 parts columbium.

9. A welding electrode as defined in claim 8, wherein said core contains from about 0.4 parts to about 1.8 parts magnesium.

10. A welding electrode as defined in claim 4, wherein said core contains from about 30 parts to about 41 parts calcium fluoride, and from about 8 parts to about 18 parts of said carbonate.

11. A welding electrode as defined in claim 10, wherein said sheath contains up to about 0.1% carbon, at least about 2% manganese, up to about 15% iron, up to about 0.5% silicon, up to about 0.5% copper, from about 18% to about 22% chromium, from about 0.2% to about 0.75% titanium, from about 1.5% to about 3.5% columbium, and the balance essentially nickel.

12. A welding electrode as defined in claim 11, wherein said carbonate is strontium carbonate.

13. A welding electrode as defined in claim 12, wherein said core contains from about 0.4 parts to about 1.8 parts magnesium.

14. A welding electrode as defined in claim 1, wherein said core contains from about 0.4 parts to about 1.8 parts magnesium.

15. A welding electrode as defined in claim 1, wherein columbium in said sheath and columbium in said core have the relationship $$8 > 0.55(Cb\ in\ sheath) + 0.43(Cb\ in\ core) > 0.5.$$

16. A welding electrode as defined in claim 15, wherein columbium in said core is present in an amount from about 6 parts to about 18 parts.

17. The process of welding comprising: maintaining an electric arc between a workpiece to be welded and the electrode of claim 1, and depositing on said workpiece by means of said arc a nickel-chromium containing metal derived from the electrode of claim 1.

* * * * *